C. G. OLSON.
GRINDING MACHINE.
APPLICATION FILED AUG. 29, 1918.
1,297,396.
Patented Mar. 18, 1919.
2 SHEETS—SHEET 1.
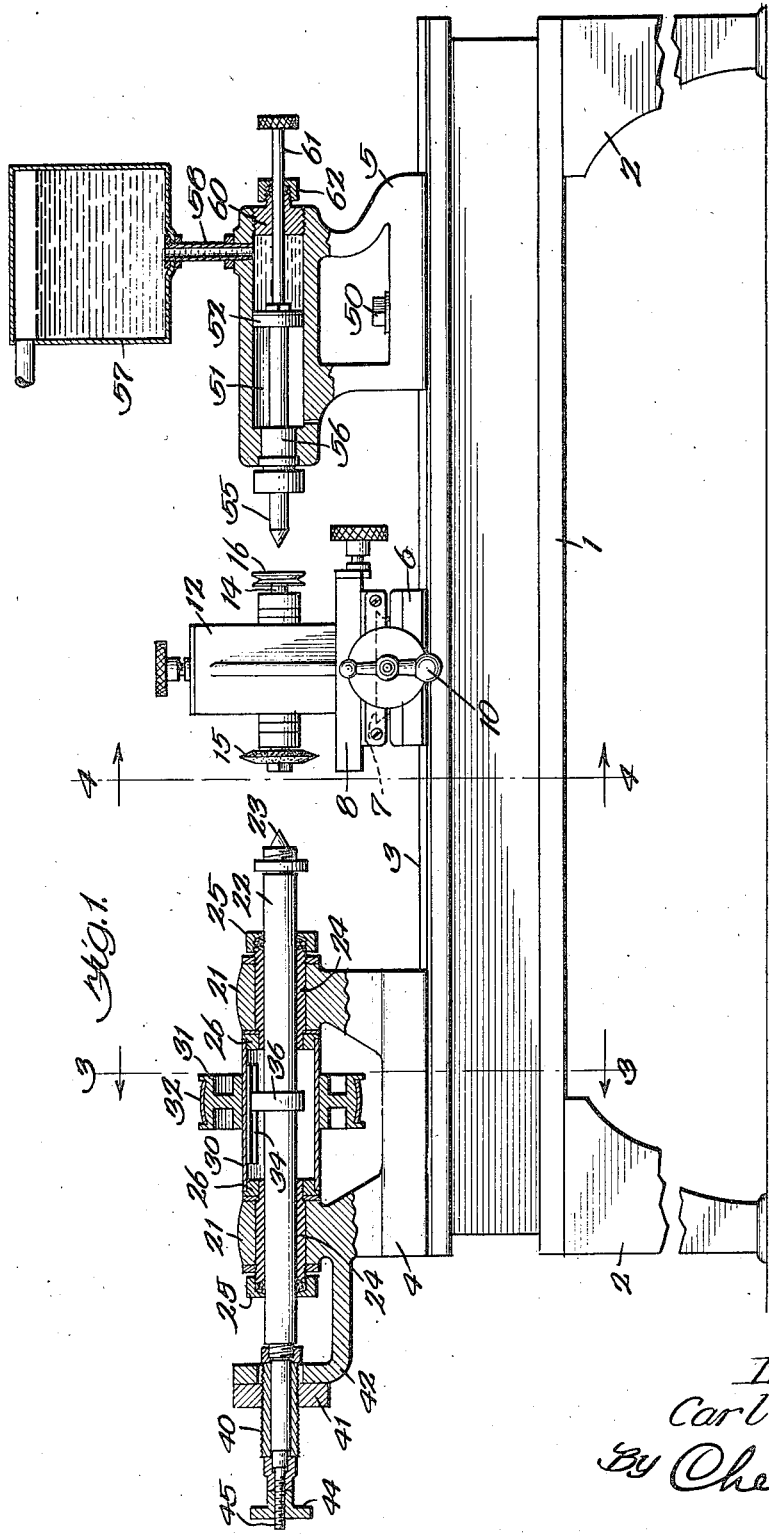
Inventor:
Carl G. Olson.
By Cheever & Cox
Attys.

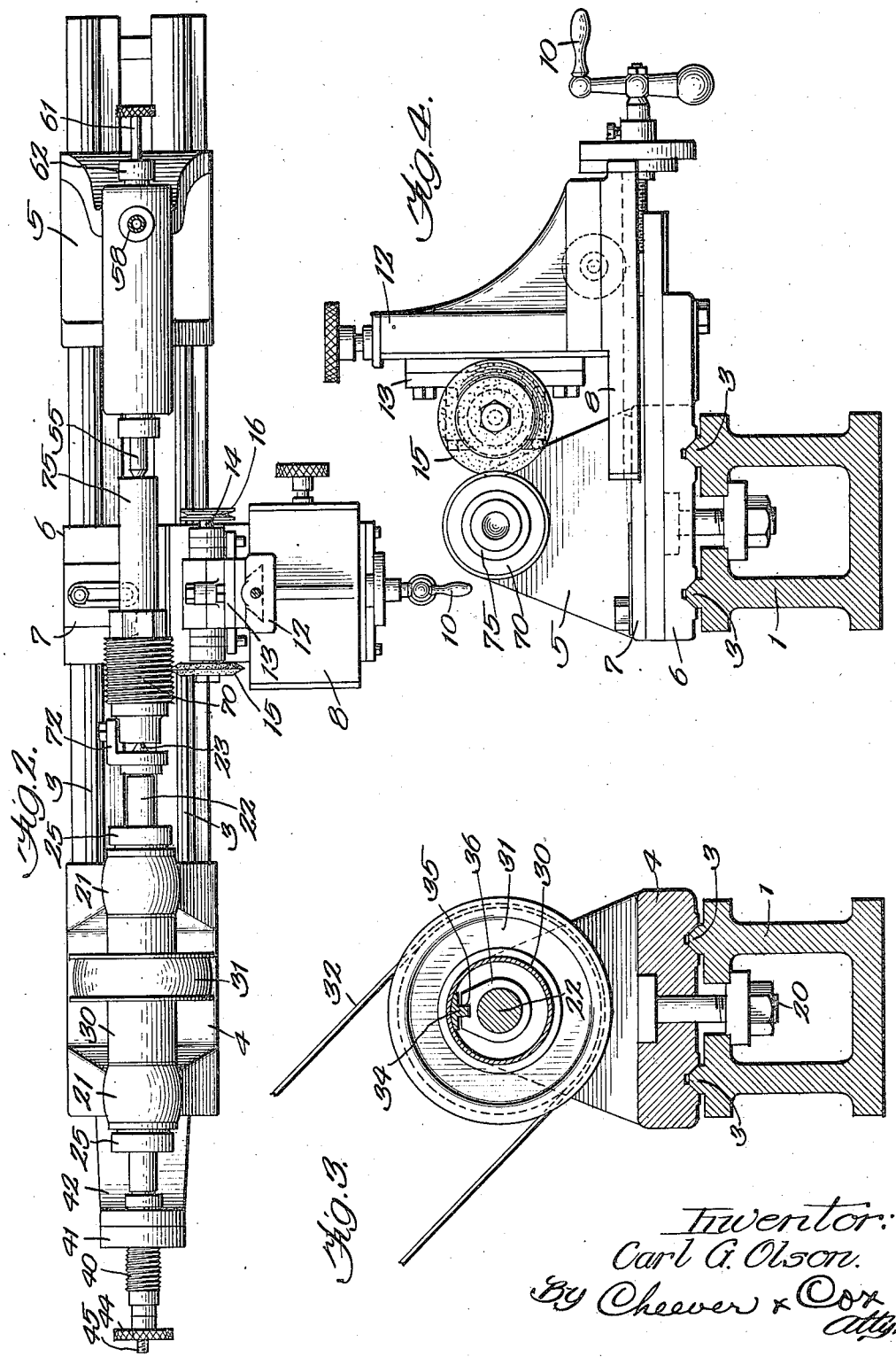

UNITED STATES PATENT OFFICE.

CARL G. OLSON, OF CHICAGO, ILLINOIS, ASSIGNOR TO ILLINOIS TOOL WORKS, OF CHICAGO, ILLINOIS, A CORPORATION OF ILLINOIS.

GRINDING-MACHINE.

1,297,396.

Specification of Letters Patent. Patented Mar. 18, 1919.

Application filed August 29, 1918. Serial No. 251,889.

*To all whom it may concern:*

Be it known that I, CARL G. OLSON, a citizen of the United States, residing at Chicago, in the county of Cook and State of Illinois, have invented a certain new and useful Improvement in Grinding-Machines, of which the following is a specification.

My invention relates to machine tools, more particularly those for producing gages and similar work requiring unusual accuracy. In the form chosen to illustrate the invention, the machine is adapted for grinding thread gages. The grinding wheel is supported upon a cross-slide and the work,—that is, the thread gage, is rotated by a spindle. In this instance, the work is not only rotated by the spindle, but is largely, and in some cases entirely, supported by it. An important object of the invention is to provide means whereby the spindle may be rotated and yet be relieved of any cross strain tending to bend the spindle. Any distortion of the spindle would reduce the accuracy of the work and it is my purpose to provide means whereby the necessary power may be imparted to the spindle without producing strains which would cause the spindle to be distorted. Another object of the invention is to provide a tail stock center which is yieldable, thus adapting it to the particular type of machine shown, in which the forming tool is fixed so far as movement in the direction of the axis of the spindle is concerned, and the spindle slides longitudinally, thus advancing the work past the tool. As the work progresses in the direction of the axis, the tail stock recedes under the pressure caused by the advance of the spindle. Another object is to provide means for automatically stopping the sliding movement of the spindle at the finish of the cut.

I accomplish my objects by the mechanism shown in the accompanying drawings, in which:

Figure 1 is a front elevation of the complete machine, parts of the headstock and tail stock being shown in axial section.

Fig. 2 is a top plan view of the machine.

Fig. 3 is a sectional view on the line 3—3, Fig. 1.

Fig. 4 is a sectional view on the line 4—4, Fig. 1.

Similar numerals refer to similar parts throughout the several views.

In the selected form, the machine has a bed 1, supported upon legs 2, and having longitudinal ways 3 for supporting the head stock 4, tail stock 5, and base 6 of the cross slide. For the present purpose, it is sufficient to say that the base 6 has cross ways 7 for supporting and guiding the table 8 of the cross slide. The position of the table 8 upon the cross ways 7 is governed by screw mechanism operated by a handle 10, in the well known manner. Rising from the table 8 is an upright or tool post 12, supporting a vertically slidable head 13 which forms a bearing for the spindle 14 of the grinding wheel 15. This spindle is driven by a sheave 16 or other appropriate means. It will be evident that the grinding wheel is adjustable vertically, axially and crosswise of the machine, but after it is properly adjusted for any piece of work, it rotates in place.

The headstock 4 is normally bolted in place upon the bed of the lathe, as for example by the bolt 20, shown in Fig. 3. It has two bearings 21, 21, located at some distance apart in line with each other. These support a spindle 22 which is both rotatable and longitudinally slidable. The spindle ends in a work center 23. While the specific design may be considerably varied, I have shown two bushings 24, provided at the outer ends with stuffing boxes 25, said bushings being supported in the bearings 21 and forming journals for the spindle. The bushings project beyond the bearings at the inner end, where they form supports for the rings 26. The rings are rotatable upon the bushings and form a support for the sleeve 30. Sleeve 30 is encircled by a wheel 31 which drives it. This wheel may be in the form of a band wheel driven by a belt 32, as shown in Fig. 3, or other appropriate type of wheel, such as a worm-gear.

Sleeve 30 has an internal diameter which is appreciably greater than the external diameter of the spindle, and consequently if the sleeve is bent or distorted due to the transverse tension of the belt, no bending effect will be transmitted to the spindle. The torque of the sleeve is, however, transmitted to the spindle by connecting mechanism, the parts whereof are relatively slidable. The sleeve 30 and the power device which drives it are rotatable but not longitudinally movable, while the spindle is both rotatable and slidable. To permit the necessary relative movement I have provided a key and key-way to connect the sleeve with the spindle. In the present case, the key 34 is fastened to the inside of the sleeve and arranged parallel to the axis. It works in a key-way 35 formed in the ring or dog 36, as shown in Fig. 3 and the upper left portion of Fig. 1. The key is shorter than the sleeve, hence when the key-way 35 has traveled past the end of the key, the spindle automatically stops. Consequently, no damage can occur if the operator fails to shut off the machine promptly.

The mechanism for causing the spindle to advance as it rotates consists of a lead screw 40, working in a nut 41, fastened to the arm 42, extending from the end of the headstock. The screw is hollow to permit the end of the spindle to pass through it and is held in place by a nut 44 which screws upon the reduced threaded end 45 of the spindle. The specific construction is immaterial, the purpose being to provide a lead screw whereby the spindle may be fed forward as it rotates, to advance the work relatively to the tool.

The tail stock, which is normally fixed on the bed of the machine by means of a bolt 50, or other device, has a piston chamber 51 in which a piston 52 works. The tail center 55 extends back to and is fastened to the piston and is guided by a bushing 56 mounted in the inner end of the tail stock. A pressure fluid of some kind is contained in the piston chamber behind the piston. In the present case, the fluid is a liquid contained in the receptacle 57 which has a passage 58 communicating with the piston chamber back of the piston. A cylinder head 60 closes the back end of the piston chamber. A rod 61 passes through the cylinder head and stuffing box 62 and forms means for guiding the piston and controlling the position of the center 55. The weight or pressure of the liquid in the vessel 57 constantly urges the piston in a direction to hold the center in connection with the work, but the action is yieldable and as the work pushes forward the center is able to recede.

In operation, let it be assumed that a thread gage 70 is to be produced. It is placed upon an arbor 71 between the centers 23 and 55 and is forced to rotate by means of a dog 72 or other appropriate means. The grinding wheel 15 is brought to proper position bodily, after which it is rotated at a comparatively high speed by the mechanism provided for the purpose. The wheel 31 is driven at low speed, which rotates the spindle and the lead screw 40, the latter causing the spindle to move longitudinally and advance the work, thus causing the grinding wheel to produce a thread upon it. When making ring gages, the work will usually be supported solely upon the spindle 22, but in other cases, such as the one shown, as the spindle advances it will push back the center 55 and piston 52.

From the foregoing, it will be seen that there is practically no transverse strain upon the spindle which would tend to produce inaccurate work. The sleeve 30 will cause the spindle to rotate, but there will be practically no tendency to flex the spindle, even though the transverse strain of the driving wheel 31 should tend to flex the sleeve. The danger of bending the spindle is also reduced by reason of the fact that the power is applied to it at a point between two bearings. This affords maximum support for the spindle and applies power to it in the most advantageous way.

Having thus described my invention, what I claim as new and desire to secure by Letters Patent, is:—

1. A machine tool having a spindle which is both rotatable and slidable in its bearings, a sleeve loosely surrounding the spindle, a screw for causing the spindle to advance as it rotates, means for rotating the sleeve, and a dog for transmitting the rotary movement of the sleeve to the spindle.

2. A machine tool having a spindle which is both rotatable and slidable in its bearings, a longitudinally fixed rotatable sleeve loosely surrounding the spindle, means for causing the spindle to advance longitudinally as it rotates, means for rotating the sleeve, and a dog connecting the sleeve to the spindle for driving the spindle.

3. A machine tool having a spindle, a head stock provided with bearings in which the spindle is both slidable and rotatable, a screw for causing the spindle to slide forward as it rotates, a rotatable sleeve encircling the spindle and spaced from it, said sleeve being held against longitudinal movement, and two inter-engaging elements, one inside the sleeve and fastened to it and the other fast on the shaft for transmitting rotation from the sleeve to the spindle, said elements being relatively slidable.

4. In a machine tool, a spindle, two bearings for it spaced apart from each other, a sleeve extending from one of said bearings to the other, said sleeve loosely encircling the shaft and being rotatably supported on said bearings, a feed screw for moving the spindle longitudinally as it rotates, means for rotating the sleeve, and a key and key-way inside the sleeve, one fastened to the sleeve and the other to the spindle for causing the spindle to rotate and at the same time permit it to move longitudinally.

5. In a machine tool having a spindle for rotating the work, means for advancing the spindle longitudinally as it rotates, a sleeve encircling the spindle and spaced from it, and a key and key-way, one part fastened to the spindle and the other to the sleeve for transmitting rotary movement from the sleeve to the spindle, one of said parts being shortened whereby the other may travel beyond the end of it and hence break the connection between the sleeve and the spindle.

6. A machine tool having a headstock provided with a spindle for rotating the work, two bearings formed upon the headstock for supporting the spindle, a sleeve loosely encircling the spindle between said bearings, rings for supporting said sleeve, said rings being rotatable and supported by said bearings, means for causing the spindle to advance longitudinally as it rotates, a power device for rotating said sleeve, and a sliding connection between the sleeve and the spindle for transmitting the rotary movement of the sleeve to the spindle and at the same time permitting relative sliding movement between the sleeve and the spindle.

7. A machine tool having a headstock provided with a spindle for rotating the work, two bearings formed upon the headstock for supporting the spindle, a sleeve loosely encircling the spindle between said bearings, rings for rotatably supporting said sleeve, a key and a key-way, one part on the sleeve and the other on the spindle for causing rotation of the spindle and permitting relative sliding movement, the key terminating at a distance from the rings greater than the axial width of the key-way for causing the parts to automatically disconnect at the end of the relative travel.

In witness whereof, I have hereunto subscribed my name.

CARL G. OLSON.